United States Patent
Huang et al.

(10) Patent No.: US 11,301,563 B2
(45) Date of Patent: Apr. 12, 2022

(54) RECURRENT NEURAL NETWORK BASED ANOMALY DETECTION

(71) Applicant: International Business Machines Corporation, Armonk, NY (US)

(72) Inventors: Heqing Huang, Mahwah, NJ (US); Taesung Lee, Ridgefield, CT (US); Ian M. Molloy, Chappaqua, NY (US); Zhongshu Gu, Ridgewood, NJ (US); Jialong Zhang, San Jose, CA (US); Josyula R. Rao, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 16/351,718

(22) Filed: Mar. 13, 2019

(65) Prior Publication Data
US 2020/0293653 A1  Sep. 17, 2020

(51) Int. Cl.
| | | |
|---|---|---|
| G06F 21/55 | (2013.01) | |
| G06N 20/00 | (2019.01) | |
| G06N 3/08 | (2006.01) | |

(52) U.S. Cl.
CPC ............ G06F 21/554 (2013.01); G06N 3/08 (2013.01); G06N 20/00 (2019.01)

(58) Field of Classification Search
CPC ...... G06F 21/50; G06F 21/554; G06F 21/566; H04L 63/14; H04L 63/1416;
(Continued)

(56) References Cited

U.S. PATENT DOCUMENTS

| 5,966,650 A | 10/1999 | Hobson et al. |
|---|---|---|
| 6,505,181 B1 | 6/2003 | Lambert et al. |

(Continued)

FOREIGN PATENT DOCUMENTS

WO    WO2012/113635 A1    8/2012

OTHER PUBLICATIONS

Bahdanau, Dzmitry et al., "Neural Machine Translation by Jointly Learning to Align and Translate", Corneil University, arXiv:1409.0473V7 [cs.CL], May 19, 2016, 15 pages.

(Continued)

*Primary Examiner* — Olugbenga O Idowu
(74) *Attorney, Agent, or Firm* — Stephen J. Walder, Jr.; Jeffrey S. LaBaw

(57) ABSTRACT

Mechanisms are provided for detecting abnormal system call sequences in a monitored computing environment. The mechanisms receive, from a computing system resource of the monitored computing environment, a system call of an observed system call sequence for evaluation. A trained recurrent neural network (RNN), trained to predict system call sequences, processes the system call to generate a prediction of a subsequent system call in a predicted system call sequence. Abnormal call sequence logic compares the subsequent system call in the predicted system call sequence to an observed system call in the observed system call sequence and identifies a difference between the predicted system call sequence and the observed system call sequence based on results of the comparing. The abnormal call sequence logic generates an alert notification in response to identifying the difference.

18 Claims, 7 Drawing Sheets

(58) Field of Classification Search
CPC . H04L 63/1483; H04L 63/20; H04L 63/1466; G06N 3/08; G06N 3/088; G06N 20/00
See application file for complete search history.

(56) References Cited

U.S. PATENT DOCUMENTS

| | | | |
|---|---|---|---|
| 10,044,751 | B2 | 8/2018 | Huston, III |
| 2017/0286690 | A1 | 10/2017 | Chari et al. |
| 2018/0063168 | A1* | 3/2018 | Sofka ............... G06N 3/0454 |
| 2018/0101681 | A1 | 4/2018 | Davis et al. |
| 2018/0241762 | A1* | 8/2018 | Savalle ............... G06N 3/006 |
| 2018/0248895 | A1 | 8/2018 | Watson et al. |
| 2019/0114417 | A1* | 4/2019 | Subbarayan ........... G06N 20/00 |

OTHER PUBLICATIONS

Cho, Kyunghyun et al., "Learning Phrase Representations using RNN Encoder-Decorder for Statistical Machine Translation", Proceedings of the 2014 Conference on Empirical Methods in Natural Language Processing (EMNLP), Oct. 25-29, 2014, pp. 1724-1734.

Chung, Junyoung et al., "Empirical Evaluation of Gated Recurrent Neural Networks on Sequence Modeling", Cornell University, arXiv:1412.3555v1 [Cs.NE], Dec. 11, 2014, 9 pages.

Graves, Alex et al., "Speech Recognition with Deep Recurrent Neural Networks", 38th International Conference on Acoustics, Speech and Signal Processing (ICASSP), 2013 IEEE, pp. 6645-6649, May 26-31, 2013.

Hermann, Karl M. et al., "Teaching Machines to Read and Comprehend", Advances in Neural Information Processing Systems 28 (NIPS 2015), Dec. 7-12, 2015, 9 pages.

Hochreiter, Sepp et al., "Long Short-Term Memory", Neural Computation 9(8):1735-1780, Nov. 15, 1997, 32 pages.

Liu, Ming et al., "Host-Based Intrusion Detection System with System Calls: Review and Future Trends", ACM Computing Surveys, vol. 51, No. 5, Article 98, Nov. 2018, 36 pages.

Pennington, Jeffrey et al., "GloVe: Global Vectors for Word Representation", Proceedings of the 2014 Conference on Empirical Methods in Natural Language Processing (EMNLP), Oct. 25-29, 2014, pp. 1532-1543.

Rush, Alexander M. et al., "A Neural Attention Model for Abstractive Sentence Summarization", Cornell University, arXiv:1509.00685v2 [cs.CL], Sep. 3, 2015, 11 pages.

Wieting, John et al., "CHARAGRAM: Embedding Words and Sentences via Character n-grams", Proceedings of the 2016 Conference on Empirical Methods in Natural Language Processing, Attached version arXiv: 1607.02789v1 [cs.CL], Jul. 10, 2016, 14 pages.

* cited by examiner

RECURRENT NEURAL NETWORK BASED ANOMALY DETECTION

This invention was made with government support under FA8650-15-C-7561 awarded by DARPA. The government has certain rights to this invention.

BACKGROUND

The present application relates generally to an improved data processing apparatus and method and more specifically to mechanisms for performing anomaly detection based on recurrent neural network operations.

Deep learning is part of a broader family of machine learning methods based on learning data representations as opposed to task-specific algorithms. Some representations are loosely based on interpretation of information processing and communication patterns in a biological nervous system, such as neural coding that attempts to define a relationship between various stimuli and associated neuronal responses in the brain. Research attempts to create efficient systems to learn these representations from large-scale, unlabeled data sets.

Deep learning architectures such as deep neural networks, deep belief networks, and recurrent neural networks, have been applied to fields including computer vision, speech recognition, natural language processing, audio recognition, social network filtering, machine translation, and bioinformatics where they produced results comparable to, and in some cases superior to, human experts.

Neural network based deep learning is a class of machine learning algorithms that use a cascade of many layers of nonlinear processing units for feature extraction and transformation. Each successive layer uses the output from the previous layer as input. The algorithms may be supervised or unsupervised and applications include pattern analysis (unsupervised) and classification (supervised). Neural network based deep learning is based on the learning of multiple levels of features or representations of the data with higher level features being derived from lower level features to form a hierarchical representation. The composition of a layer of nonlinear processing units of the neural network used in a deep learning algorithm depends on the problem to be solved. Layers that have been used in deep learning include hidden layers of an artificial neural network and sets of complicated propositional formulas. They may also include latent variables organized layer-wise in deep generative models such as the nodes in deep belief networks and deep Boltzmann machines.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided for detecting abnormal system call sequences in a monitored computing environment. The method comprises receiving, from a computing system resource of the monitored computing environment, a system call of an observed system call sequence for evaluation. The method further comprises processing, by a trained recurrent neural network (RNN) trained to predict system call sequences, the system call to generate a prediction of a subsequent system call in a predicted system call sequence. In addition, the method comprises comparing, by abnormal call sequence logic, the subsequent system call in the predicted system call sequence to an observed system call in the observed system call sequence. Moreover, the method comprises identifying, by the abnormal call sequence logic, a difference between the predicted system call sequence and the observed system call sequence based on results of the comparing, and generating, by the abnormal call sequence logic, an alert notification in response to identifying the difference.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
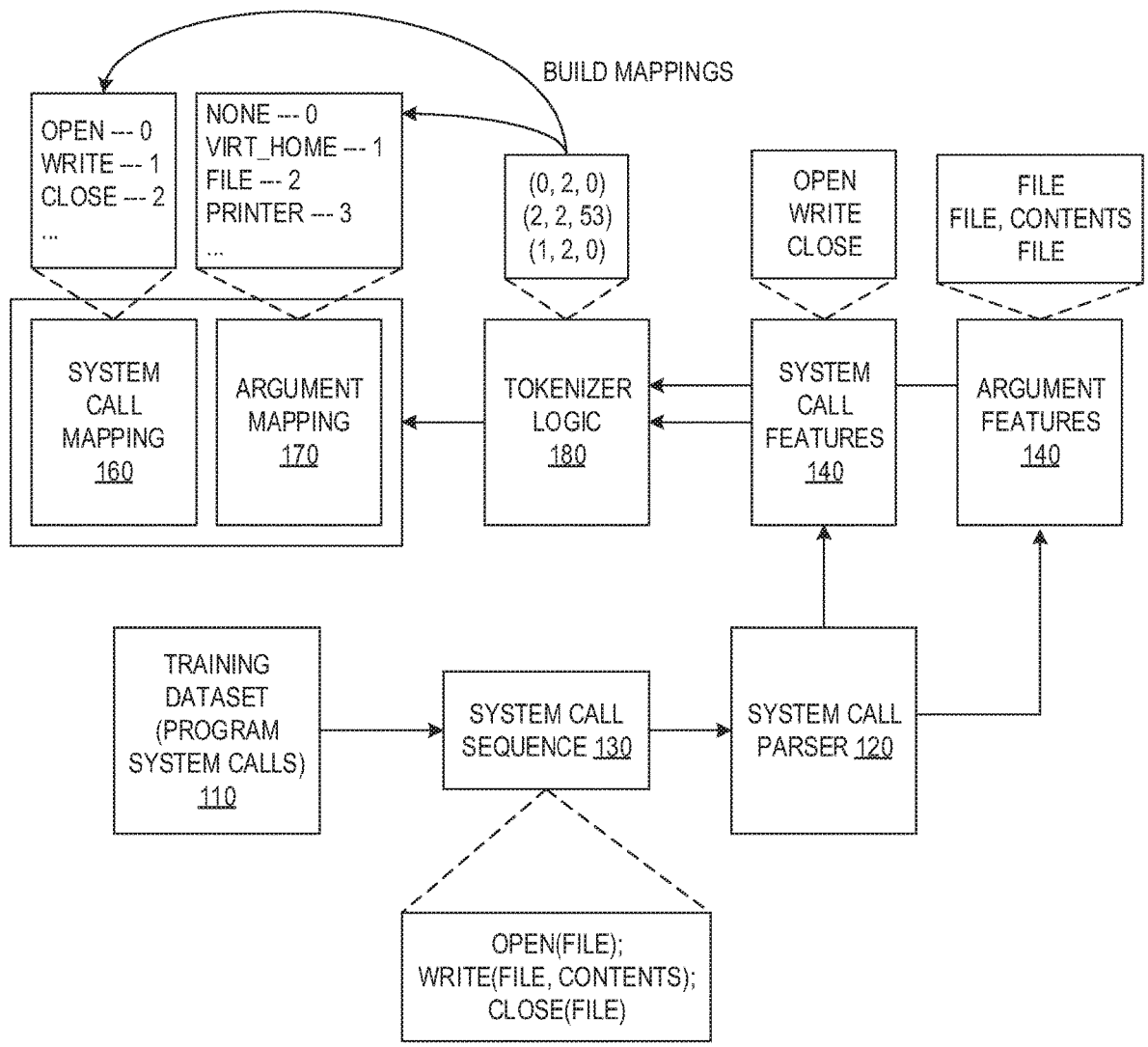
FIG. 1 is an example diagram illustrating a tokenizing operation for system calls in accordance with one illustrative embodiment.

The illustrative embodiments provide mechanisms for leveraging advanced features of recurrent neural networks (RNNs), e.g., the long-term dependency and enhanced expressive power provided by long short term memory (LSTM), Gated Recurrent Units (GRUs), and the like, to provide models that detect anomalous event sequences and generate appropriate alerts to authorized users, such as computing system administrators. A recurrent neural network (RNN) is a class of artificial neural network where connections between nodes form a directed graph along a sequence. This allows it to exhibit temporal dynamic behavior for a time sequence. Unlike feedforward neural networks, RNNs can use their internal state (memory) to process sequences of inputs. This makes them applicable to tasks such as unsegmented, connected handwriting recognition or speech recognition, for example.

The term "recurrent neural network" is used to refer to two broad classes of networks with a similar general structure, where one is finite impulse and the other is infinite impulse. Both classes of networks exhibit the temporal dynamic behavior noted above. A finite impulse recurrent network is a directed acyclic graph that can be unrolled and replaced with a strictly feedforward neural network, while an infinite impulse recurrent network is a directed cyclic graph that cannot be unrolled. Both finite impulse and infinite impulse recurrent networks can have additional stored state, and the storage can be under direct control by the neural network. The storage can also be replaced by another network or graph, if that incorporates time delays or has feedback loops. Such controlled states are referred to as gated state or gated memory, and are part of long short-term memory networks (LSTMs) and gated recurrent units (GRUs). The illustrative embodiments leverage the power of RNNs and their LSTMs or GRUs to perform anomaly detection with regard to critical computing system resources.

Detecting true anomalies in critical computing system resources is difficult due to the long dependencies among system event traces and the complexity of modeling system arguments. That is, system attacks, e.g., APT attacks, usually consist of long attack vectors, which take, as the first steps, operations of probing and penetrating into critical system resources (e.g., subject processes, object files, etc.), and then the hijacked processes or system resources are used to collect information and perform other suspicious activities, e.g., lateral movement. As one of the final steps, the system attack will locate its target(s) and perform harmful operations such as data exfiltration and system sabotage. Thus, the detection of anomalies to identify potential malice that deviates from normal behavior is an extremely difficult problem.

For decades, research regarding anomaly detection has been focused on analyzing computing system behavior based on system-call traces. Most of the existing anomaly based methodologies try to identify meaningful features using the frequency of individual calls and/or sliding window patterns of calls from sequences of system calls, e.g., n-gram, hidden Markov model, graph pattern matching, etc. However, such methods have limited ability to capture system call-level features (e.g., system call events and arguments) and phrase-level features (long term system call dependencies) simultaneously. Moreover, such methods have an inherent limitation in that the probability of a next system call event is determined by only a fixed number of system calls. For example, if a method uses window size of 3 (e.g., a 3-gram) is given an anomalous sequence of length 4, the method cannot detect the anomaly. For example, suppose a system call sequence [Open, Read, Mmap] is anomalous. If a system call is added into the sequence, i.e., [Open, Read, NoOp Mmap], the 3-gram based approach would have no idea if this is anomalous or not as it only sees [Open, Read, NoOp] and [Read, NoOp, Mmap]. There is no ability with known mechanisms to learn complicated patterns from system call sequences of arbitrary length in excess of fixed window sizes, i.e. long term system call dependencies.

As can be seen from the above, existing mechanisms are essentially "short sighted" when it comes to attempting to detect true anomalies associated with system attacks. While existing anomaly detection systems, such as n-gram or Hidden Markov Model (HMM) have limited pattern revealing capabilities which are efficient for defending against known malicious behavior or simple attacks, they do not have the ability to foresee or reason over long attack vectors or arbitrary lengths that are mostly unknown. Furthermore, the known mechanisms only look to the system calls themselves, and do not have an ability to evaluate a mapping of the arguments to the system calls as well.

The mechanisms of the illustrative embodiments address the limitations of these previous approaches by providing an improved computer tool implementing an improved computer model based on recurrent neural network (RNN) technology, which may operate on call sequences of arbitrary length, that is specifically modified to jointly learn the semantics of individual system calls, system call arguments, and their interactions appearing in call sequences of relevant objects, e.g., registry keys, files, sockets, IPC objects, and the like, and/or subjects, e.g., processes, container tasks/groups, etc. The combination of the semantics of individual system calls, system call arguments, and their interactions represent a new "meaning," i.e. a particular combination of these features that is indicative of a particular result, which is recognizable and classifiable by the RNN.

The mechanisms of the illustrative embodiments comprise a recurrent neural network (RNN) having a plurality of long short term memory (LSTM) or gated recurrent unit (GRU) cells which are trained, through a machine learning training process, to predict sequences of system calls and the probability of each next system call given a previous system call. In one embodiment, a variant of LSTM or GRU cells incorporating timestamp of system calls can be used. In particular, a temporal control layer is provided in the LSTM or GRU cell to update some of the values of the state variable based on the elapsed time from the previous system call event. For example, some normal computer program might invoke two system calls temporally apart for a certain amount of time. If given two system calls do not show that amount of time interval, the temporal control layer can update the state to remove the possibility of this pattern, and lower the probability, leading to detecting an anomalous behavior. Without such a layer, the LSTM or the GRU will ignore the intervals of system calls, and as long as their system call orders are the same, they will be considered the same sequence, which might not be the case.

The trained RNN may be used to identify normal sequences of system calls and/or system calls that are indicative of an anomaly that may be associated with an attack. For example, the RNN may be given, as an input, one or more system calls and their corresponding arguments. The RNN then predicts the probability of a next system call in the sequence to determine how likely the next system call is a given system call. A threshold probability value or rank may be utilized to determine whether the next system call corresponding to the given system call has a sufficient probability to indicate that it is part of a normal system call sequence. However, if the probability or rank of the given system call is relatively low, i.e. it is not likely that it is a normal system call that would occur after the previous sequence of system calls, then the system call may be flagged as an anomaly potentially part of an attack. This process may be repeated for an entire system call sequence encountered by one or more computing system resources of a particular computing environment, such that mispredictions may accumulate over multiple system calls in a sequence leading to increased probabilities that an observed system call sequence is likely anomalous. A corresponding alert may then be generated in order to take appropriate actions to protect computing system resources from such attacks.

For example, assume that RNN has already been trained using the mechanisms of the illustrative embodiments described hereafter. Also assume that s# is a system call name, a# is a first argument, and b# is a second argument, where # corresponds to a monotonically increasing integer representing a placement in a sequence of system calls, such that a system call is defined as (s#, a#, b#). It should be appreciated that while the present description will use only the system call name and the first two arguments of a system call, i.e. s#, a#, and b#, for ease of description, the illustrative embodiments are not limited to such and any number of system call features, arguments, and the like, may be used without departing from the spirit and scope of the illustrative embodiments.

Assume that a sequence of system calls (s1, a1, b1)—(s2, a2, b2)—(s3, a3, b3) is observed by a computing system. In such a sequence, it is desirable to know whether the system call (s3, a3, b3) is a likely a normal system call that would follow (s1, a1, b1) and (s2, a2, b2) or if it is more likely an abnormal system call which may be part of an attack on the critical system. In order to determine such, the system call sequence is fed into the trained RNN of the illustrative embodiments as an input and the trained RNN computes the probability that (s3, a3, b3) is a likely next system call given the sequence (s1, a1, b1)—(s2, a2, b2). In order to maintain the output of the RNN at a reasonable size, the probability may be generated as separate probabilities for each of "s3", "a3", and "b3" with the total probability for the combination being a combination of the individual probabilities. The probability value generated by the RNN for the combination of "s3", "a3", "b3" may be compared to one or more probability threshold values indicating categories of likelihood that the system call is a normal, abnormal, or indeterminate next system call in the sequence.

Based on the comparison to the one or more probability threshold values, an alert may be logged, transmitted, or otherwise provided to a system administrator or the like, to investigate the possibility of an attack on critical system resources. In some illustrative embodiments automated operations may be executed in response to the detection of potential attack based anomalies. For example, a process that submits the suspect system call sequence may be automatically quarantined or future system calls may be blocked/filtered since it is known what system calls caused the anomaly to be detected, or the arguments that caused the anomaly to be detected, the blocking/filtering may be performed based on such factors so as to set a customized sandbox around the anomaly triggers. In some cases, the automatic operation may comprise additional forensic data collection regarding the process to make forensics easier. In some cases, the process that submitted the suspicious system call sequence may be terminated, such as if it is known that the process accesses sensitive data or performs a sensitive operation.

As mentioned above, the trained RNN may operate on inputs representing system calls or sequences of system calls. The system calls may be collected by an auditing or monitoring component in an operating system kernel of a computing system being monitored as the potential target of an attack. The collecting procedures performed by such an auditing or monitoring component may be performed independent of the RNN training and operation. Moreover, the system call data may be collected from multiple computing systems with the combination of such system call data being used to train the RNN and/or may be the subject of the processing by the RNN to determine if the system call sequences are indicative of anomalous behavior. The RNN based mechanisms of the illustrative embodiments may be implemented on a different computing system from those being monitored. Once the RNN is fully trained, monitored computing systems may send system call sequences dynamically to the computing system configured with and executing the trained RNN. Alternatively, the system calls may be compiled into a log data structure or the like, and the RNN may be provided with such logs on a period basis for processing to identify logged system call sequences that may be indicative of anomalous behavior so that appropriate alerts may be generated and transmitted. Thus, the mechanisms of the illustrative embodiments may operate dynamically as system calls are captured by auditing or monitoring components and dynamically sent to the trained RNN mechanisms, or may be performed in a periodic manner, or in response to a request to process a log data structure, in response to a log data structure being provided to the RNN mechanisms for processing.

During training of the RNN, a training dataset comprising combinations of system calls and their arguments is provided where the combinations are sequenced. Each system call in the sequences provided in the training dataset is parsed to extract system call features and argument features which are then tokenized by mapping the system call features and argument features to corresponding integer values. The tokenizing and mapping of the system call features and argument features makes the representation of these elements for use in training the RNN more efficient. The tokenizing and mapping is performed separately for system call features and argument features such that different mapping data structures are provided for system call features and for argument features. This allows for smaller size vocabularies and mapping data structures, or indexes, by avoiding having to represent all possible combinations of system call features and argument features in a single mapping data structure.

For example, there may be a first mapping data structure, or index, that maps tokens, such as integer values, to system call names, and a second mapping data structure, or index, that maps tokens, such as integer values, to arguments. The tokens, or integer values, in the illustrative embodiments described herein will be assumed to be monotonically increasing integer values that are assigned to system call names and arguments in an arbitrary manner, such as based on a first come, first served encountering of the system calls and arguments when performing training, or based on a previous established mapping of system calls and arguments to tokens or integer values. Thus, for example, a first index will have entries in which each entry has a system call name and a corresponding integer value. A second index will have entries in which each entry has an argument and a corresponding integer value, where integer values may be reused between the two indices such that an entry in the first index may have a corresponding integer value of "3" to represent a system call name, and an entry in the second index may also have a corresponding integer value of "3" to represent a corresponding argument.

Having defined the mappings between system call features and argument features to corresponding tokens, system calls in the training dataset may be represented as a set of tokens, which for purposes of the present description are assumed to be integer values as mentioned above. Thus, for example, a system call of the type "write(file, contents)" may be represented as (2, 2, 53). These integer value representations of system calls may be used along with system call and argument embedding matrix data structures to generate a vector representation of the system call which can be used as an input to the RNN.

In accordance with the illustrative embodiments, a separate embedding matrix data structure is created for the system call features and for the arguments, i.e. there is a system call embedding matrix data structure and an argument embedding matrix data structure. The matrices comprise embedding values whose values are randomly initialized, but whose values will be dynamically updated as the RNN is trained. The values themselves are values learned by the RNN, but may not correspond to human understanding. However, these values represent a feature of the embedded entity (e.g., system call name or argument) that is learned to "best" produce a certain output, i.e. the next system call after the given sequence in the present illustrative embodiments. That is, it may not be known what the human understandable meaning is of the entries in the embedding matrices, but these entries represent the RNN learned features of embedded entities that permit the RNN to accurate predict the next system call in a sequence of system calls. However, for purposes of understanding, one could imagine that an embedding value of 1 may represent that a resource is open and −1 may represent the resource is closed, as one example.

A row of embedding values maps to a corresponding integer value in the tokenized version of the system call. Thus, each integer value, or token, in the tokenized version of the system call is used to retrieve a corresponding row from the appropriate embedding matrix data structure. For example, if the system call name value in the tokenized system call has a value of "0", then the first row of the system call embedding matrix data structure is retrieved. The same is done for each of the arguments based on their integer values specified in the tokenized version of the system call by mapping the integer values to corresponding rows in the argument embedding matrix data structure. The resulting retrieved rows are concatenated together to generate a vector representation of the system call. It should be appreciated that multiple system calls as part of a sequence of system calls may be processed in this manner so as to provide a sequence input to the RNN for processing.

The RNN receives the vector representation of the system call as an input and processes the input vector via one or more layers of long short term memory (LSTM) memory cells to generate an output indicating each system call feature and a corresponding probability value, and each argument and a corresponding probability value. The probability values indicate the probability that a next system call in the sequence of system calls comprises that system call feature or that system call argument. It should be appreciated that multiple sets of argument and corresponding probability values may be generated based on the number of arguments of a system call being considered, e.g., if the RNN is configured to evaluate the first two arguments of a system call, then a first set of arguments and corresponding probability values may be associated with predicting the probability that each of the arguments is a first argument in the next system call, and a second set of arguments (which may be the same set of arguments as the first set) and corresponding probability values (which will likely be different from the probability values associated with the first set of arguments) may be associated with predicting the probability that each of the arguments is a second argument in the next system call. By separating out the output of the LSTMs into separate probabilities for system call feature and arguments, the size of the probability output may be kept manageable as opposed to having to represent every possible combination of system call feature and arguments.

The probabilities of each combination of system call feature and arguments may be generated by combining the individual probabilities of each of the system call feature, and each of the arguments, e.g., argument 1, argument 2, etc. Thus, for each potential combination of (s#, a#, b#) for example, a corresponding probability may be generated by combining the probabilities for s#, a#, and b#, giving the probability of the system call (s#, a#, b#). The combining of the probabilities may be any function of the probability values, a simple example being the product of a multiplication of the probabilities, e.g., p(s#) * p(a#) * p(b#)=p(s#, a#, b#).

This operation is repeated for each LSTM cell given their corresponding input. Thus, for example, in a first layer of LSTM cells of the RNN, a first LSTM cell may be given the first system call in an input sequence, a second LSTM cell may be given a second system call in the input sequence, and so on, along a row of LSTM cells of the RNN. Each LSTM cell column in the RNN operates to identify a prediction of the next system call in the sequence. Thus, for example, if the input system call sequence is the vector representations of system calls vec(0, 2, 0) and vec(2, 2, 53), then the first column of LSTM cells receiving the input vec(0, 2, 0) generates a prediction as to the probability that the next system call is vec(2, 2, 53) (along with each other combination of system call name and arguments). Similarly, the second column of LSTM cells generates a prediction as to the probability of a next system call given the input of vect(2, 2, 53). Thus, probabilities of each system call in a sequence of system calls is generated and an overall probability of the sequence as a whole may be generated from the combination of individual properties as well.

When training the RNN, and its LSTM cells that make up the RNN, the training goal is to have a highest probability for the actual next system call in the sequence. That is, the training data set specifies an actual system call sequence. Thus, the training is adjusting operational parameters of the RNN's LSTM cells to make it predict correctly the known system call sequence. For example, if the known system call sequence comprises vec(0, 2, 0)—vec(2, 2, 53), then the training is concerned with adjusting operational parameters, and in particular in the illustrative embodiments the values of the embedding matrices, such that given an input of vec(0, 2, 0), the RNN will accurately predict, with a highest probability, that the next system call will be vec(2, 2, 53). This training goal is defined in terms of a loss function, such as a cross entropy loss function, which is then minimized through iterative training of the RNN.

An optimization methodology is utilized to optimize (minimize) the loss function, where in some illustrative embodiments this optimization methodology is a gradient descent optimization methodology which is used to compute the direction of change of each operational variable that would improve the correctness of the prediction, i.e. minimize the loss function. This is done for each output from the output layer, which reside on top of each LSTM cell in the last layer of the RNN with each LSTM cell, or RNN cell (LSTM cell is a specific implementation of an RNN used for purposes of illustration only), in the chain sharing the weights. That is, the LSTM chain of the RNN is represented as a "rolled-out" view, i.e. C-C-C . . . where C is an LSTM cell. However, the actual implementation may comprise a single cell C representing all of C-C-C . . . , such that all Cs use the same weights. To simplify, one can consider the RNN Cell to be $C(x)=ax$, such that the RNN cell chain C-C-C means $C(C(C(x)))=a^3 x$ which has only one weight parameter a. However, in some implementations, there can be indeed distinct cells/layers, like C1 and C2, where $C1(x)=a1\ x$, and $C2(x)=a2\ x$ and thus, the chain is represented as $C1(C2(x))=a1\ a2\ x$. In the depicted example, there are two LSTM chains, one made up of C1 and the other made up of C2. The RNN first computes C1(C1( . . . (x)), and pass it to the next chain, computing C2(C2( . . . (C1 (C1( . . . (x)) . . . )). In this case, there are two weight parameters, a1 and a2, for the two chains.

The optimization methodology employed, which will be assumed to be a stochastic gradient descent optimization hereafter for purposes of illustration, provides an indication of how to adjust the particular variable and the variable is then updated based on this indication and the process is repeated iteratively with the same and different system call sequences in the training dataset. Thus, for example, the optimization methodology provides the gradients for adjusting the values in the system call embedding matrix and argument embedding matrix data structures such that the gradient is propagated back to the embedding matrices and the entries in the matrices are updated or modified in accordance with the gradient. Once the loss function is equal to or less than a predetermined threshold level of loss, the RNN is considered to have been fully trained (converged) and the trained RNN may be deployed for use in processing new system calls and/or sequences of system calls.

Thus, the illustrative embodiments provide mechanisms for leveraging the temporal tracking aspects of RNNs to train an RNN to predict system call sequences that are indicative of normal and/or abnormal system call sequences. The trained RNN may be used to process system calls and/or system call sequences to identify potential anomalies that may be associated with attacks on critical system resources. Based on the identification of such anomalies, appropriate alerts may be logged, transmitted, or otherwise output for informing system administrators so that they can take appropriate actions to minimize exposure of computing system resources to such attacks.

The mechanisms of the illustrative embodiments may be applied to other sequences to predict the normal/abnormal nature of such sequences. That is, while the illustrative embodiments are described in terms of evaluating the normality/abnormality of system call sequences, the illustrative embodiments may be applied to other sequences without departing from the spirit and scope of the present invention. For example, the mechanisms of the illustrative embodiments may be used to identify normal/abnormal network traffic for network intrusion detection, API calls instead of system calls for program anomaly detection, and the like. Other examples of sources of sequences that may be the basis for the operations of the illustrative embodiments include, but are not limited to, logs from cloud systems, database management systems, web servers, and the like. Any sequence of events may be evaluated using the RNN mechanisms of the illustrative embodiments without departing from the spirit and scope of the present invention, e.g., queries in a database system, creation, use and deletion (CRUD) of resources, cloud monitoring events—create a virtual machine, power cycle, create storage, authorize new identity, etc., business processes for fraud detection, etc.

It should be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general-purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for training a recurrent neural network (RNN) to classify input system calls and/or system call sequences into classifications of normal or abnormal, where normal means that the system call or system call sequence represents normal non-adversarial behavior, and abnormal means that the system call or system call sequence represents a likelihood of adversarial behavior, e.g., an attack on computing system resources. With the mechanisms of the illustrative embodiments, a tokenization of system call features, e.g., system call name, and arguments is generated and used to convert system calls into a tokenized representation which may be used to retrieve system call feature and argument embeddings that are combined to generate a vector input to the RNN. Each LSTM, or RNN cell, of the RNN generates a probability value associated with each system call feature and each argument to determine a probability of the next system call in a system call sequence. The LSTMs, or RNN cells, may be configured with a temporal control layer as mentioned previously, that modifies the probability value based on the determination of temporal factors that affect the likelihood that a system call sequence is a true call sequence or potentially part of an attack, e.g., if two given system calls do not show a learned amount of time interval between the system calls, the temporal control layer can update the state of the LSTM or RNN cell to lower the probability, leading to detecting an anomalous behavior.

The prediction of the next system call in a system call sequence may be compared to an input to determine a likelihood that the input represents a normal/abnormal system call or system call sequence. In response to an abnormality being detected by the comparison, an appropriate alert, log entry, responsive action, or the like, may be generated for further evaluation to determine an appropriate action to take and/or perform such an action to protect the computing system resources from the potential attack, e.g., isolation of processes such as via a sandboxing operation, filtering/blocking of processes, etc.

FIG. 1 is an example diagram illustrating a tokenizing operation for system calls in accordance with one illustrative embodiment. As discussed previously above, and shown in FIG. 1, during training of the RNN, a training dataset 110 comprising combinations of system calls and their arguments is provided where the combinations are sequenced. The system calls in the training dataset 110 represent system calls that may be made by a program executing on one or more computing systems or computing resources of a managed computing environment. It should be appreciated that once the RNN is trained, actual system calls and/or system call sequences may be made by programs 110 executing on the computing systems or computing system resources, and these system calls and/or system call sequences may be evaluated by the trained RNN. The system calls may be provided dynamically as the system calls are captured by an auditing or monitoring component of the operating system kernel.

A system call parser 120 parses each system call 130 in the sequences provided in the training dataset 110 to extract system call features 140 and argument features 150 which are then tokenized by tokenizer logic 180 mapping the system call features 140 and argument features 150 to corresponding tokens, which in the depicted example are integer values. In the depicted example, a structured data based embedding is utilized such that each portion of structured data is converted to a corresponding embedding using tokenization and mapping to corresponding embeddings. Thus, for example, the system call name "open" may be tokenized as the integer value "0", whereas the system call name "write" may be tokenized as the integer value "1." Similarly, the argument "file" may be tokenized to the integer value "2", and the argument "contents" may be tokenized to the integer value "53" in the depicted example. While a structured data based embedding and hence, structured data based tokenization, are performed in the depicted examples, the illustrative embodiments are not limited to such and any other level of tokenization and embedding may be utilized including atomic level tokenization, e.g., word embeddings and the like, and tokenization based on substructures such as characters in text and the like.

Moreover, in the depicted example, only the first two arguments of each system call are evaluated and processed by the RNN and thus, are tokenized and corresponding embeddings utilized to represent the system calls. However, any number of arguments may be processed by the mechanisms of the illustrative embodiments without departing from the spirit and scope of the present invention. Moreover, in some illustrative embodiments, as a pre-processing operation, arguments may be abstracted by dropping fine details and grouping similar arguments to further reduce the size of the vocabulary that needs to be embedded using the embedding mechanisms of the illustrative embodiments. This will reduce computational costs and increase generalization power.

With reference again to FIG. 1, the tokenizing and mapping of the system call features 140 and argument features 150 makes the representation of these elements for use in training the RNN more efficient. The tokenizing and mapping is performed separately for system call features 140 and argument features 150 such that different mapping data structures 160, 170 are provided for system call features 140 and for argument features 150. This allows for smaller size vocabularies and mapping data structures, or indexes, 160 and 170 by avoiding having to represent all possible combinations of system call features 140 and argument features 150 in a single mapping data structure.

For example, there may be a first mapping data structure, or index, 160 that maps tokens, such as integer values, to system call names, and a second mapping data structure, or index, 170 that maps tokens, such as integer values, to arguments. The tokens, or integer values, in one illustrative embodiment, are monotonically increasing integer values that are assigned to system call names and arguments in an arbitrary manner, such as based on a first come, first served encountering of the system calls and arguments when performing training, or based on a previous established mapping of system calls and arguments to tokens or integer values. Separate sets of monotonically increasing integer value tokens may be used for system call names and for arguments.

Using the mapping data structures (or indices) 160, 170, when a system call is processed, it is converted by the tokenization mechanisms into a token representation of the system call by translating the system call name into an integer value using the system call name mapping data structure 160 and translating the arguments into integer values using an argument mapping data structure 170. The integer values are used to build a tokenized representation of the system call, such as (0, 2, 0) representing the system call "open(file)", (2, 2, 53) representing the system call "write (file, contents)." These integer value representations of system calls may be used to reference corresponding entries, e.g., rows, in the system call and argument embedding matrix data structures, as described hereafter, which each store the set of learned embedding features for the corresponding system call name or argument, which may be combined to generate a vector representation of the system call which can be used as an input to the RNN.

Figure 2:
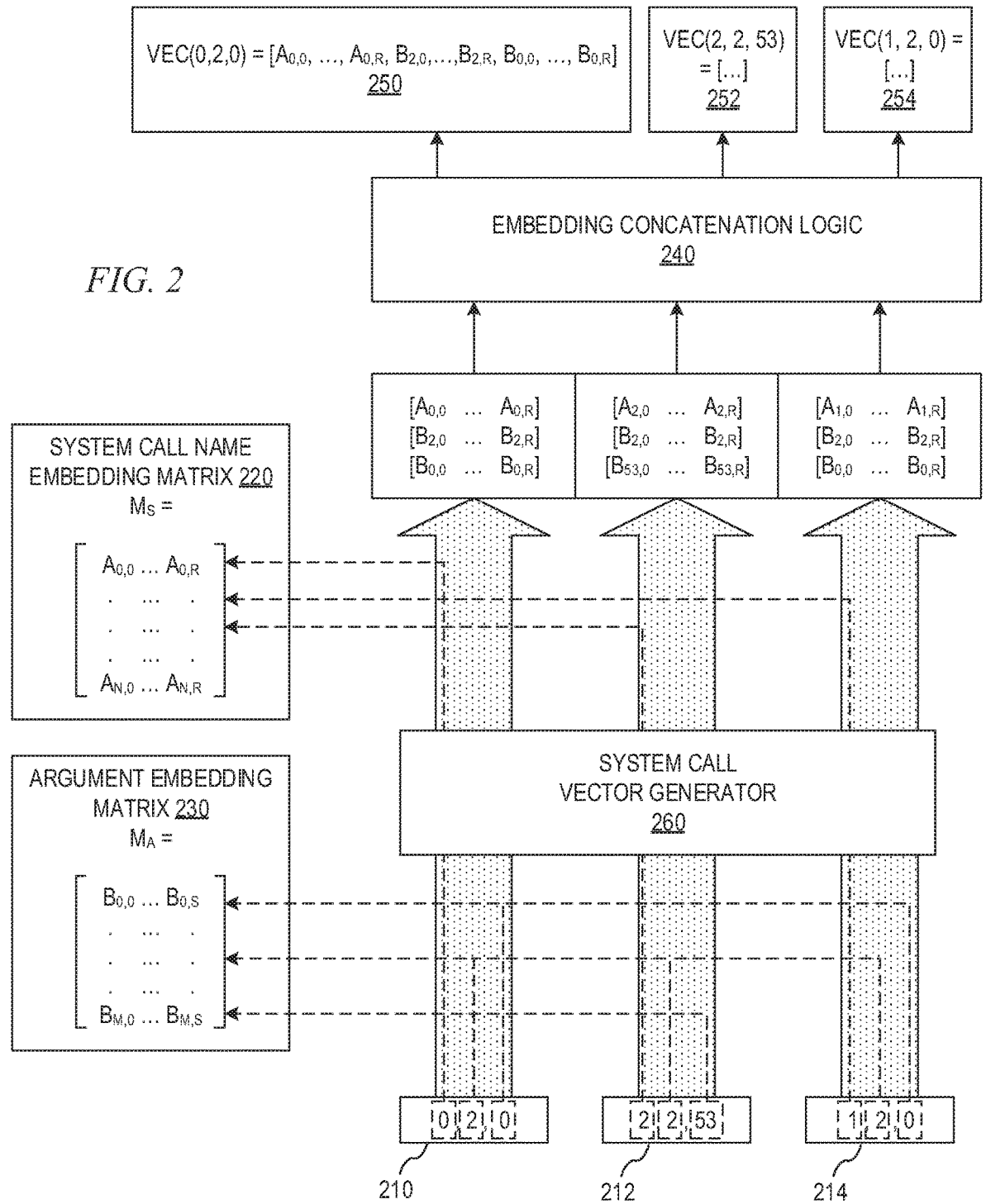
FIG. 2 is an example diagram illustrating an operation for converting a tokenized system call into a vector representation in accordance with one illustrative embodiment.

FIG. 2 is an example diagram illustrating an operation for converting a tokenized system call into a vector representation in accordance with one illustrative embodiment. As shown in FIG. 2, the system call vector generator 260 performs a conversion of the tokenized system call 210-214 to a corresponding vector representation 250-254 using the integer values in the tokenized representation 210 of the system call, e.g., system call representation 210, to index into the corresponding embedding matrix data structures 220, 230 to retrieve the corresponding entries that are then used to build the vector representation of the corresponding system call. During training, the embedding matrix data structures 220, 230 are randomly initialized, however the final values of the embedding variables, e.g., $A_{0,0}$ to $A_{n,r}$ and $B_{0,0}$ to $B_{m,s}$, are learned by the RNN via the machine learning process as discussed previously. There is a separate embedding matrix data structure 220 for system call features, e.g., system call names, and a separate embedding matrix data structure 230 for arguments. It should be appreciated that the same argument embedding matrix data structure 230 may be used for each argument slot in the system call, e.g., first argument, second argument, third argument, etc. With regard to the system call name embedding matrix data structure 220, n represents the number of different system call names, while r represents the size of learned system call name embedding vectors. Similarly, with regard to the argument embedding matrix data structure 230, m represents the number of different arguments, while s represents the number of learned argument embedding features.

The values in the rows of the embedding matrix data structures 220, 230 themselves are values learned by the RNN, but may not correspond to human understanding. Each of these values represent a feature of the embedded entity, e.g., system call name or argument, that is learned to "best" produce a certain output, i.e. a portion of the next system call after the given sequence. For example, the system call name embedding matrix data structure 220 comprises rows of embedding feature values that together provide learned features that are optimized to predict the next system call and arguments given the input system call name. Similarly, the argument embedding matrix data structure 230 comprises rows of embedding feature values that together provide learned features that are optimized to predict the next system call and arguments given the input argument of an input system call.

A row of embedding values maps to a corresponding integer value in the tokenized version of the system call. Thus, each integer value, or token, in the tokenized version of the system call is used to retrieve a corresponding row from the appropriate embedding matrix data structure 220, 230. For example, if the system call name value in the tokenized system call has a value of "0", then the first row of the system call embedding matrix data structure is retrieved. The same is done for each of the arguments based on their integer values specified in the tokenized version of the system call by mapping the integer values to corresponding rows in the argument embedding matrix data structure. The resulting retrieved rows are concatenated together by embedding concatenation logic 240 to generate a vector representation of the system call. It should be appreciated that multiple system calls, as part of a sequence of system calls, may be processed in this manner, sequentially or in parallel, so as to provide a sequence input to the RNN for processing comprising a sequence of vector representations of system calls.

The example shown in FIG. 2 shows a system call sequence comprising three system calls corresponding to those shown in FIG. 1, i.e. open(file), write(file, contents), and close(file) with their corresponding tokenized versions of (0, 2, 0); (2, 2, 53); and (1, 2, 0) respectively. Each system call in the sequence is tokenized in the manner shown in FIG. 1 and the tokens are then used as indices into the rows of the corresponding embedding matrix data structures 220, 230. For example, the integer value "0" of the system call (0, 2, 0) is used to retrieve the first row of the system call name embedding matrix data structure 220, i.e. $a_{0,0}, \ldots a_{0,r}$. The integer value "2" of the system call (0, 2, 0) is used to retrieve the third row of the argument embedding matrix data structure 230, i.e. $b_{2,0}, \ldots b_{2,r}$. The third integer value "0" of the system call (0, 2, 0) is used to retrieve a first row of the argument embedding matrix data structure 230, i.e. $b_{0,0}, \ldots b_{0,r}$.

The retrieved rows of embedding values are concatenated by the embedding concatenation logic 240 to generate a corresponding vector vec(0, 2, 0). In the depicted example, the concatenated vector 250 comprises the system call name embedding values followed by the first argument's embedding values, and then the second argument's embedding values, and so on. It should be appreciated that this only one example of a manner by which the embedding values may be combined to generate a vector representation of the system call, and any other suitable methodology for combining the embedding values for the separately retrieved embedding values may be used without departing from the spirit and scope of the illustrative embodiments. Moreover, it should be appreciated that this process is performed for each of the additional system calls 212-214 in the system call sequence comprising system calls 210-214, e.g., for system calls (2, 2, 53) and (1, 2, 0) in the depicted example, resulting in vector representations for these additional system calls as well, e.g., system call vector representations 252-254. The resulting vector representations 250-254 are then input to the RNN for processing.

Figure 3:
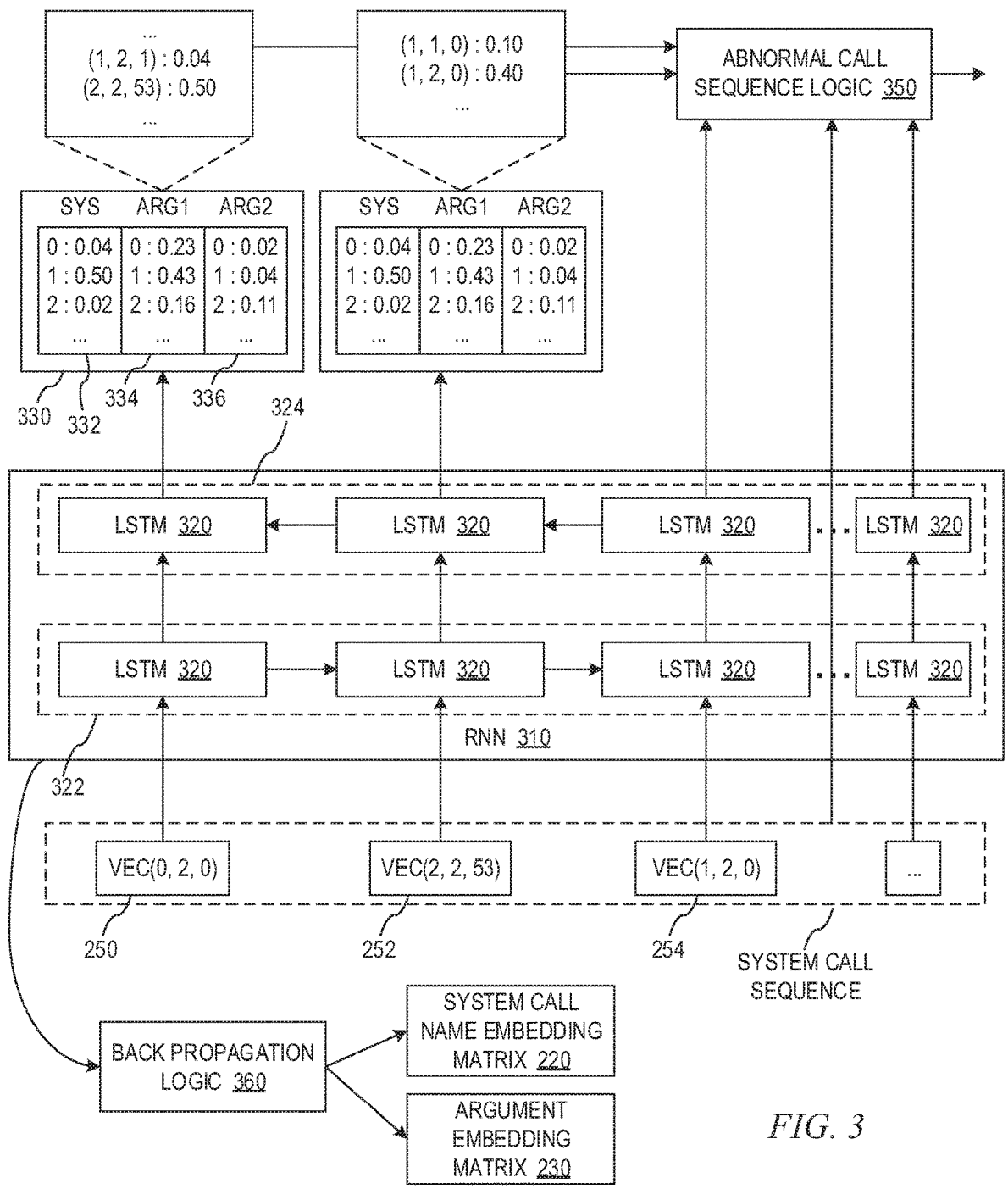
FIG. 3 is an example diagram illustrating an operation for training a recurrent neural network (RNN) in accordance with one illustrative embodiment.

FIG. 3 is an example diagram illustrating an operation for training a recurrent neural network (RNN) in accordance with one illustrative embodiment. As shown in FIG. 3, the RNN 310 receives the vector representation(s) 250-254 of the system call as an input and processes the input vector(s) 250-254 via one or more layers of long short term memory (LSTM) memory cells 320 to generate an output 330 indicating each system call feature (e.g., system call name) and a corresponding probability value 332, and each argument and a corresponding probability value 334-336. The probability values indicate the probability that a next system call in the sequence of system calls comprises that system call feature or that system call argument. It should be appreciated that multiple sets of argument and corresponding probability values may be generated based on the number of arguments of a system call being considered, e.g., if the RNN 310 is configured to evaluate the first two arguments of a system call, then a first set of arguments and corresponding probability values 334 may be associated with predicting the probability that each of the arguments is a first argument in the next system call, and a second set of arguments (which may be the same set of arguments as the first set) and corresponding probability values 336 (which will likely be different from the probability values associated with the first set of arguments) may be associated with predicting the probability that each of the arguments is a second argument in the next system call.

Again, by separating out the output of the LSTM cells 320 into separate probabilities for system call feature and arguments, the size of the probability output may be kept manageable as opposed to having to represent every possible combination of system call feature and arguments, while still being able to represent each combination by providing probability combination logic that generates the probability value for a combination of system call feature and argument features based on the individual probabilities for the system call feature and each of the argument features. For example, a first probability value P1 may be generated by the RNN 310 for a system call name feature of "2" (corresponding to "write"), a second probability value P2 may be generated by the RNN 310 for a first argument A1 being argument "2" (corresponding to "file"), and a third probability value P3 may be generated by the RNN 310 for a second argument A2 being argument "53" (corresponding to "contents"). By combining the probability values P1, P2, and P3, a total probability value for the system call (2, 2, 53) is generated indicating a probability that the next system call in the sequence of system calls is (2, 2, 53), e.g. 0.50 in the depicted example.

Thus, for each potential combination of (s#, a#, b#) for example, a corresponding probability may be generated by combining the probabilities for s#, a#, and b#, giving the probability of the system call (s#, a#, b#). The combining of the probabilities may be any function of the probability values, a simple example being the product of a multiplication of the probabilities, e.g., p(s#)*p(a#)*p(b#)=p(s#, a#, b#).

This operation is repeated for each output layer of LSTM cells 320 given a corresponding input to an input layer of LSTM cells 322. Thus, for example, in a first layer 322 of LSTM cells of the RNN 310, a first LSTM cell may be given the first system call in an input sequence, e.g., vec(0, 2, 0) in the depicted example, a second LSTM cell may be given a second system call in the input sequence, e.g., vec(2, 2, 53) in the depicted example, and so on, along a row of LSTM cells 322 of the RNN 310. Each LSTM cell column in the RNN 310 operates to identify a prediction of the next system call in the sequence. Thus, for example, if the input system call sequence is the vector representations of system calls vec(0, 2, 0) and vec(2, 2, 53), then the first column of LSTM cells receiving the input vec(0, 2, 0) generates a prediction as to the probability that the next system call is vec(2, 2, 53) (along with each other combination of system call name and arguments). Similarly, the second column of LSTM cells generates a prediction as to the probability of a next system call given the input of vect(2, 2, 53). Thus, probabilities of each system call in a sequence of system calls is generated and an overall probability of the sequence as a whole may be generated from the combination of individual properties as well.

When training the RNN 310, and its LSTM cells 320 that make up the RNN 310, the training goal is to have a highest probability for the actual next system call in the sequence, i.e. if the next system call is vec(2, 2, 53), the LSTM cells should output a probability value for vec(2, 2, 53) that is a highest probability of the various combinations of system call feature and argument feature. This is done for each subsequent system call in a system call sequence. The training data set used to train the RNN 310 specifies an actual system call sequence. Thus, the training is adjusting operational parameters of the RNN's LSTM cells 320 to make it predict correctly the known system call sequence. For example, if the known system call sequence comprises vec(0, 2, 0)—vec(2, 2, 53), then the training is concerned with adjusting operational parameters, and in particular in the illustrative embodiments the values of the embedding matrices, such that given an input of vec(0, 2, 0), the RNN 310 will accurately predict, with a highest probability, that the next system call will be vec(2, 2, 53). This training goal is defined in terms of a loss function, such as a cross entropy loss function, which is then minimized through iterative training of the RNN 310.

In some illustrative embodiments embodiment, a variant of LSTM cells or RNN cells, incorporating timestamp of system calls can be used. In particular, a temporal control layer may be provided in the LSTM or RNN cell to update some of the values of the state variable based on the elapsed time from the previous system call event. For example, a computer program may invoke two system calls temporally apart for a certain amount of time. If two given system calls do not show that amount of time interval, the temporal control layer can update the state to remove the possibility of this pattern, and lower the probability, leading to detecting an anomalous behavior. This allows elapsed time intervals to be used as a further factor in distinguishing true system call sequences from potential attacks by utilizing learned temporal intervals between system calls as evidence for evaluating the authenticity of observed system call sequences.

As noted previously, an optimization methodology is utilized to optimize (minimize) the loss function, where in some illustrative embodiments this optimization methodology is a gradient descent optimization methodology which is used to compute the direction of change of each operational variable that would improve the correctness of the prediction, i.e. minimize the loss function. This is done for each output from each LSTM cell 320 in a last layer 324 of the LSTM cells of the RNN 310 prior to the output layer of the RNN 310, with each LSTM cell chain sharing the weights. The optimization methodology logic employed, e.g., a stochastic gradient descent optimization, provides an indication of how to adjust the particular variable and the variable is then back propagation logic 340 back propagates the gradient to the embedding matrix data structures so as to update the embedding values based on the gradient. The process is repeated iteratively with the same and different system call sequences in the training dataset until the loss of the loss function is equal to or less than a predetermined threshold, at which point the RNN 310 is assumed to have been fully trained.

Thus, for example, the optimization methodology provides the gradients for adjusting the values in the system call embedding matrix 220 and argument embedding matrix data structures 230 such that the gradient is propagated back to the embedding matrices 220, 230 and the entries in the matrices are updated or modified in accordance with the gradient. Once the loss function is equal to or less than a predetermined threshold level of loss, the RNN 310 is considered to have been fully trained (converged) and the trained RNN 310 may be deployed for use in processing new system calls and/or sequences of system calls.

The trained RNN 310 may then receive a new input system call or system call sequence and may predict a system call sequence comprising one or more subsequent system calls based on the input system call or system call sequence. Abnormal call sequence logic 350 may be provided to compare the predictions generated by the RNN 310 to an actual system call sequence received to determine the probability that the actual system call sequence is a normal system call sequence or an abnormal system call sequence. A corresponding classification operation may be performed based on the probabilities and the degree of matching between the predicted system call sequence and the actual system call sequence. The classification of the actual system call sequence with regard to being normal or abnormal may be output by the trained RNN 310 to an abnormality alerting logic module 360 which generates an appropriate alert and/or log entry indicating the abnormality and the potential that the abnormality is part of an attack on computing system resources.

Figure 4:
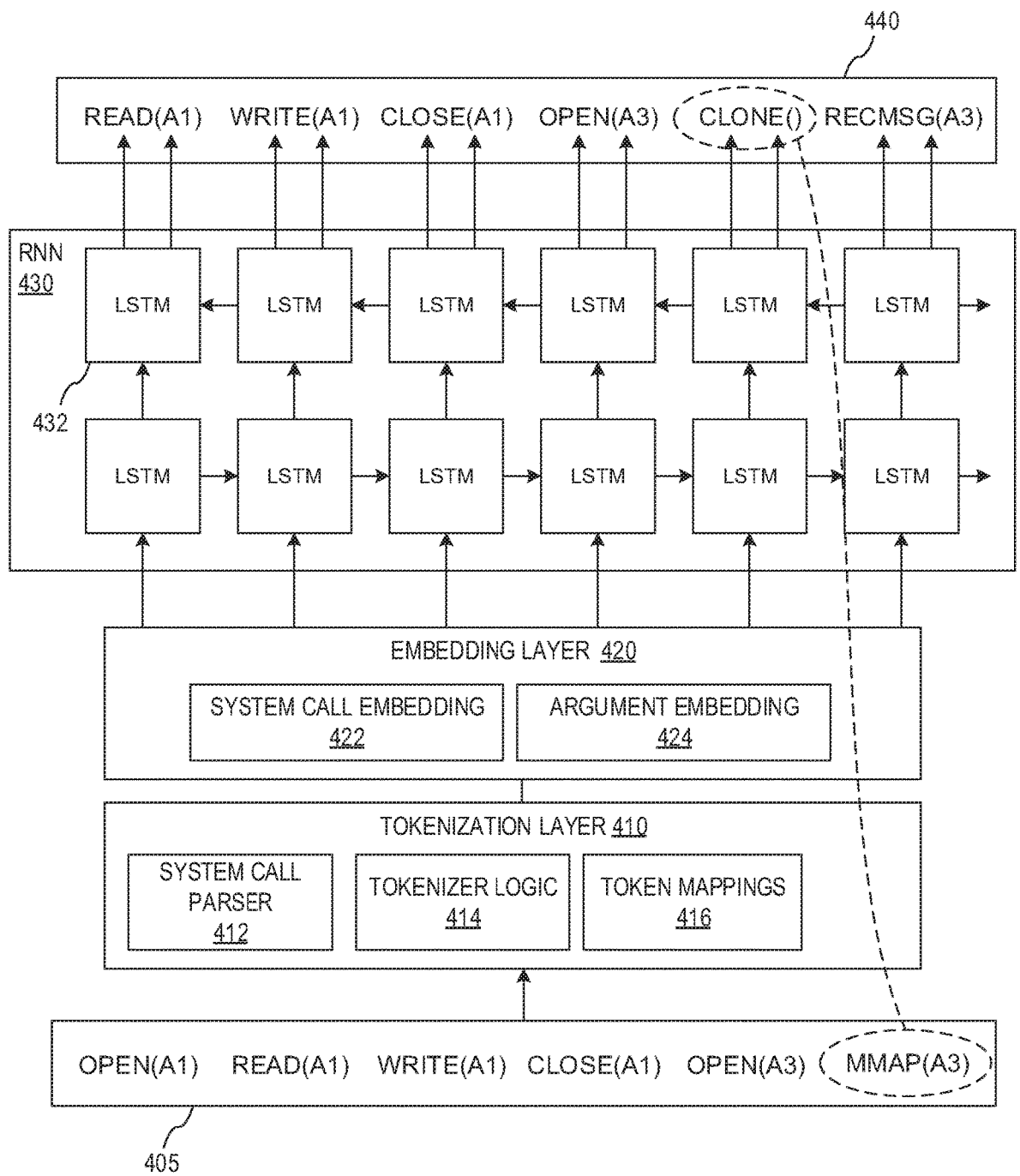
FIG. 4 is an example diagram illustrating an instance in which anomalous system call behavior is identified in accordance with one illustrative embodiment.

FIG. 4 is an example diagram illustrating an instance in which anomalous system call behavior is identified in accordance with one illustrative embodiment. The example shown in FIG. 4 assumes that the RNN 430 has been trained to predict the next system call in a system call sequence given a current system call. Moreover, the example in FIG. 4 assumes that only the first argument of a system call is being evaluated, for ease of depiction of the example.

As shown in FIG. 4, the input system call sequence 405 that is actually observed from a computing system resource is input to the tokenization layer 410 which performs operations such as described previously with regard to FIG. 1 to tokenize the system calls. This operation involves the system call parser 412 parsing the system calls in the input system call sequence 405 to extract the system call features and the argument features which are then tokenized by the tokenizer logic 414 and the established token mappings 416 for the system call features and the argument features. The tokenized system calls are provided to the embedding layer 420 which performs system call embedding 422 and argument embedding 424 such as in the manner previously described above with regard to FIG. 2, and outputs vector representations of the system calls in the input system call sequence 405, which are input to respective ones of LSTMs in the trained RNN 430.

The LSTMs in the RNN 430 predict a next system call in the system call sequence 405 given an input system call. Thus, for example, LSTM 432, given the input of a system call of "OPEN(A1)" generates predicted probabilities for the system call features and argument features, and logic (not shown) combines these probabilities to generate probabilities for various system calls comprising a system call feature and an argument feature, e.g., system call feature "READ" and argument feature "A1". A top ranking probability combination may be surfaced as the prediction of the next system call in the system call sequence 405. This process may be repeated for each subsequent system call input from the system call sequence 405.

Thus, in the example shown in FIG. 4, given the input system call "OPEN(A1)" in input 405, the LSTM 432 predicts that the next system call will be "READ(A1)" in the prediction output 440. Similarly, the next LSTM predicts, given "OPEN(A1)" and then "READ(A1)", that the next system call will be "WRITE(A1)". This process continues such that the entire predicted system call sequence 440 is generated.

The predicted system call sequence 440 may be compared to the actual observed system call sequence 405 to determine if there are differences. In the depicted example, the RNN 430 precited that the system call "CLONE( )" would follow "OPEN(A3)". However, in the observed system call sequence 405, the actual system call observed was "MMAP (A3)". A difference between the predicted system call and the observed system call may be considered an anomaly and potentially a possible attack on the computing system resource. As a result, probability comparison and alert generation logic 450 may operate to determine whether to generate an alert/log of an anomaly or not and to generate an alert notification that may be logged and/or transmitted to a system administrator or other authorized personnel so that they may investigate whether the anomaly is indeed part of an attack or not and perform appropriate corrective actions. In some illustrative embodiments, the probability comparison and alert generation logic 450 may maintain a count of detected anomalies over a period of time such that when the count reaches a threshold number of anomalies, an alert notification may be generated and output/logged.

In some illustrative embodiments, the probability comparison and alert generation logic 450 may compare the difference in the probability scores of the predicted and actual system call sequences to a threshold value indicating a level of probability at which a sufficient degree of certainty the RNN has in the prediction of the system call sequence at the point of the difference. Based on results of the comparison, a determination is made by the logic 450 as to whether the certainty of the RNN in the prediction, and the fact that the actual system call sequence differs as this point in the sequence, indicates that the discrepancy is likely due to an attack. That is, the comparison can be used to measure the magnitude of the anomaly. A manually tuned threshold may be utilized, which may be program specific since some programs have higher entropy by nature, to alert the system administrator or authorized personnel, or it can be used as analytics that can be combined with other system features for an additional classifier.

Figure 5:
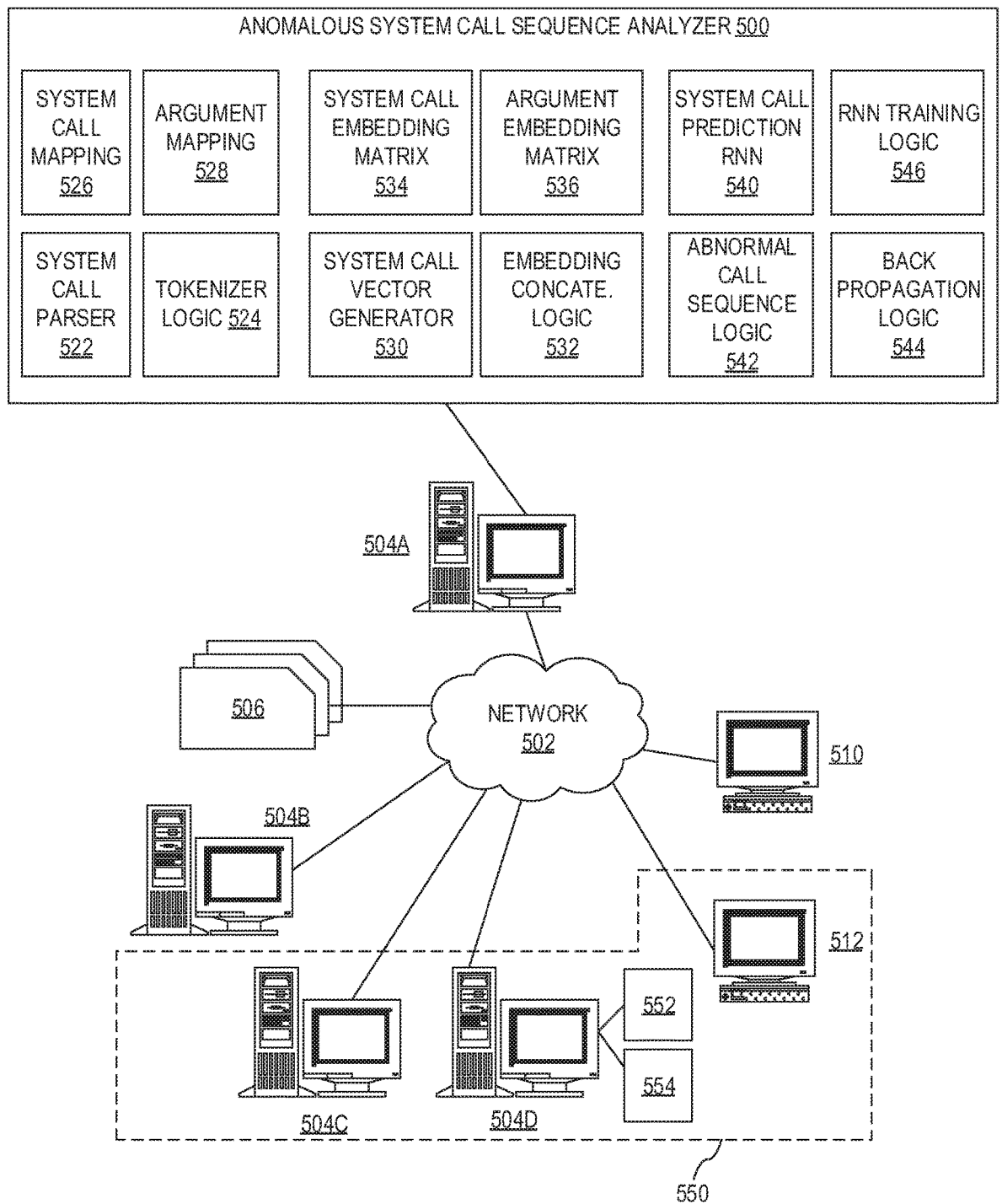
FIG. 5 is an example diagram illustrating a distributed data processing system in which aspects of the illustrative embodiments may be implemented.

FIG. 5 is an example diagram illustrating a distributed data processing system in which aspects of the illustrative embodiments may be implemented. The anomalous system call sequence analyzer 500 is implemented on one or more computing devices 504A-D (comprising one or more processors and one or more memories, and potentially any other computing device elements generally known in the art including buses, storage devices, communication interfaces, and the like) connected to the computer network 502. For purposes of illustration only, FIG. 5 depicts the anomalous system call sequence analyzer 500 being implemented on computing device 504A only, but may be distributed across multiple computing devices, such as a plurality of computing devices 504A-D. It should be appreciated that the computing devices 504A-D which are used to implement the anomalous system call sequence analyzer 500 are specifically configured to be special purpose computing systems for specifically providing the anomalous system call sequence analyzer 500 and thus, are not generic computing systems once configured to implement the anomalous system call sequence analyzer 500.

The network 502 includes multiple computing devices 504A-D, which may operate as server computing devices, and 510-512 which may operate as client computing devices, in communication with each other and with other devices or components via one or more wired and/or wireless data communication links, where each communication link comprises one or more of wires, routers, switches, transmitters, receivers, or the like. In some illustrative embodiments, the anomalous system call sequence analyzer 500 and network 502 enables system call sequence auditing and monitoring capabilities for identifying anomalous system call sequences for one or more anomalous system call sequence analyzer 500 users via their respective computing devices 510-512. In some illustrative embodiments, the anomalous system call sequence analyzer 500 and network 402 may provide mechanisms for enabling security to protect physical and/or logical resources, such as computing systems, databases, particular files or data maintained by computing systems, etc. based on an evaluation of a system calls encountered by one or more computing system resources of a computing environment. Other embodiments of the anomalous system call sequence analyzer 500 may be used with components, systems, sub-systems, and/or devices other than those that are depicted herein.

As shown in FIG. 5, the anomalous system call sequence analyzer 500, in accordance with the mechanisms of the illustrative embodiments, includes logic implemented in specialized hardware, software executed on hardware, or any combination of specialized hardware and software executed on hardware, for evaluating an input system call or system call sequence, predicting one or more subsequent system calls of a system call sequence, and determining if the predictions and the observed system calls indicate the potential for an attack on a computing system resource of a monitored computing environment 550 comprising one or more computing system resources, e.g., client 512 and servers 504C and 504D in the depicted example. That is, the anomalous system call sequence analyzer 500 comprises a system call parser 522, tokenizer logic 524, system call mapping data structure 526, argument mapping data structure 528, system call vector generator 530, embedding concatenation logic 532, system call embedding matrix data structure 534, argument embedding matrix data structure 536, system call prediction recurrent neural network (RNN) 540, abnormal call sequence logic 542, back propagation logic 544, and RNN training logic 546.

The elements 522-528 operate in a similar manner as described above with regard to similar elements 120, 160, 170, and 180 in FIG. 1. The elements 530-536 operate in a similar manner as described above with regard to similar elements 220, 230, 240, and 260 in FIG. 2. The elements 540-544 operate in a similar manner as described above with regard to similar elements 310, 350, and 360 in FIG. 3. The RNN training logic 546 provides the logic for overseeing and orchestrating the training of the system call prediction RNN 540 using a machine learning operation as described above to adjust operational variables, such as the values in the embedding matrices 534, 536 and other operational parameters so as to minimize a loss function and converge the system call prediction RNN 540 to a trained state. The RNN training logic 546 may utilize the back propagation logic 544 to back propagate the modifications to the embedding matrices 534-536 as previously described above.

One or more of the computing resources in the monitored computing environment 550 may have a monitoring or auditing agent 552 associated with the computing resource which captures system calls and either dynamically transmits the system calls to the anomalous system call sequence analyzer 500 as they occur, collects the system calls in a log data structure 554 for subsequent sending to the anomalous system call sequence analyzer 500, such as at a scheduled time or on a periodic basis, or the like. The monitoring or auditing agent 552 may be implemented as part of an operating system kernel of the corresponding computing resource, e.g., 504D, and may operate as a background process capturing system calls as they occur and logging/transmitting them to the anomalous system call sequence analyzer 500.

In response to receiving one or more system calls from the monitoring or auditing agent 552, the anomalous system call sequence analyzer 500 parses and tokenizes the system call(s) using the elements 522-528 and the process described above with regard to FIG. 1, and generates a vector representation of the system call(s) using elements 530-536 and the process described above with regard to FIG. 2. The resulting vector representations of the system call(s) are input to the trained system call prediction RNN 540 which generates probabilities of the system call features and argument features of the subsequent system calls in a system call sequence, given the input system call(s). The abnormal call sequence logic 542 may then compare the predictions to the observed system call sequence and determine if there are anomalies in what is observed in the monitored computing environment 550. If there are anomalies, an appropriate alert may be generated and logged/transmitted to a system administrator or other authorized individual, e.g., sending an alert notification to a system administrator workstation, such as client 512, for example.

Figure 6:
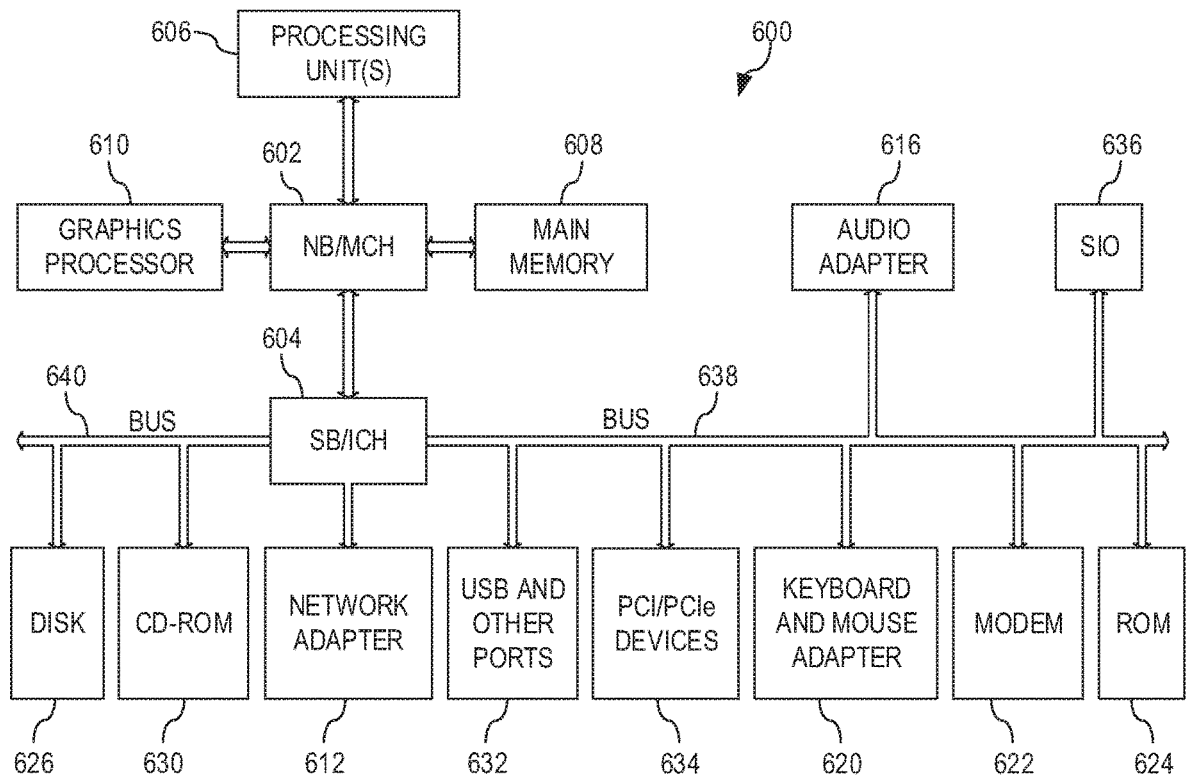
FIG. 6 is an example block diagram of a data processing system in which aspects of the illustrative embodiments may be implemented.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 6 is provided as an example of one type of data processing system in which aspects of the present invention may be implemented. Many other types of data processing systems may be likewise configured to specifically implement the mechanisms of the illustrative embodiments.

FIG. 6 is an example block diagram of a data processing system in which aspects of the illustrative embodiments may be implemented. Data processing system 600 is an example of a computer, such as server computing device 504A or client computing device 510 in FIG. 5, in which computer usable code or instructions implementing the processes for illustrative embodiments of the present invention are located. In one illustrative embodiment, FIG. 6 represents a server computing device, such as a server 504A, which implements the additional mechanisms of the illustrative embodiments described herein with regard to the anomalous system call sequence analyzer 500.

In the depicted example, data processing system 500 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 is connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 626 and CD-ROM drive 630 may use, for example, an integrated drive electronics (IDE) or serial advanced technology attachment (SATA) interface. Super I/O (SIO) device 636 is connected to SB/ICH 604.

An operating system runs on processing unit 606. The operating system coordinates and provides control of various components within the data processing system 600 in FIG. 6. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 600.

As a server, data processing system 600 may be, for example, an IBM® eServer™ System p® computer system, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as HDD 626, and are loaded into main memory 608 for execution by processing unit 606. The processes for illustrative embodiments of the present invention are performed by processing unit 606 using computer usable program code, which is located in a memory such as, for example, main memory 608, ROM 624, or in one or more peripheral devices 626 and 630, for example.

A bus system, such as bus 638 or bus 640 as shown in FIG. 6, is comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, includes one or more devices used to transmit and receive data. A memory may be, for example, main memory 608, ROM 624, or a cache such as found in NB/MCH 602 in FIG. 6.

Those of ordinary skill in the art will appreciate that the hardware depicted in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6. Also, the processes of the illustrative embodiments may be applied to a multiprocessor data processing system, other than the SMP system mentioned previously, without departing from the spirit and scope of the present invention.

Moreover, the data processing system 600 may take the form of any of a number of different data processing systems including client computing devices, server computing devices, a tablet computer, laptop computer, telephone or other communication device, a personal digital assistant (PDA), or the like. In some illustrative examples, data processing system 600 may be a portable computing device that is configured with flash memory to provide non-volatile memory for storing operating system files and/or user-generated data, for example. Essentially, data processing system 600 may be any known or later developed data processing system without architectural limitation.

Figure 7:
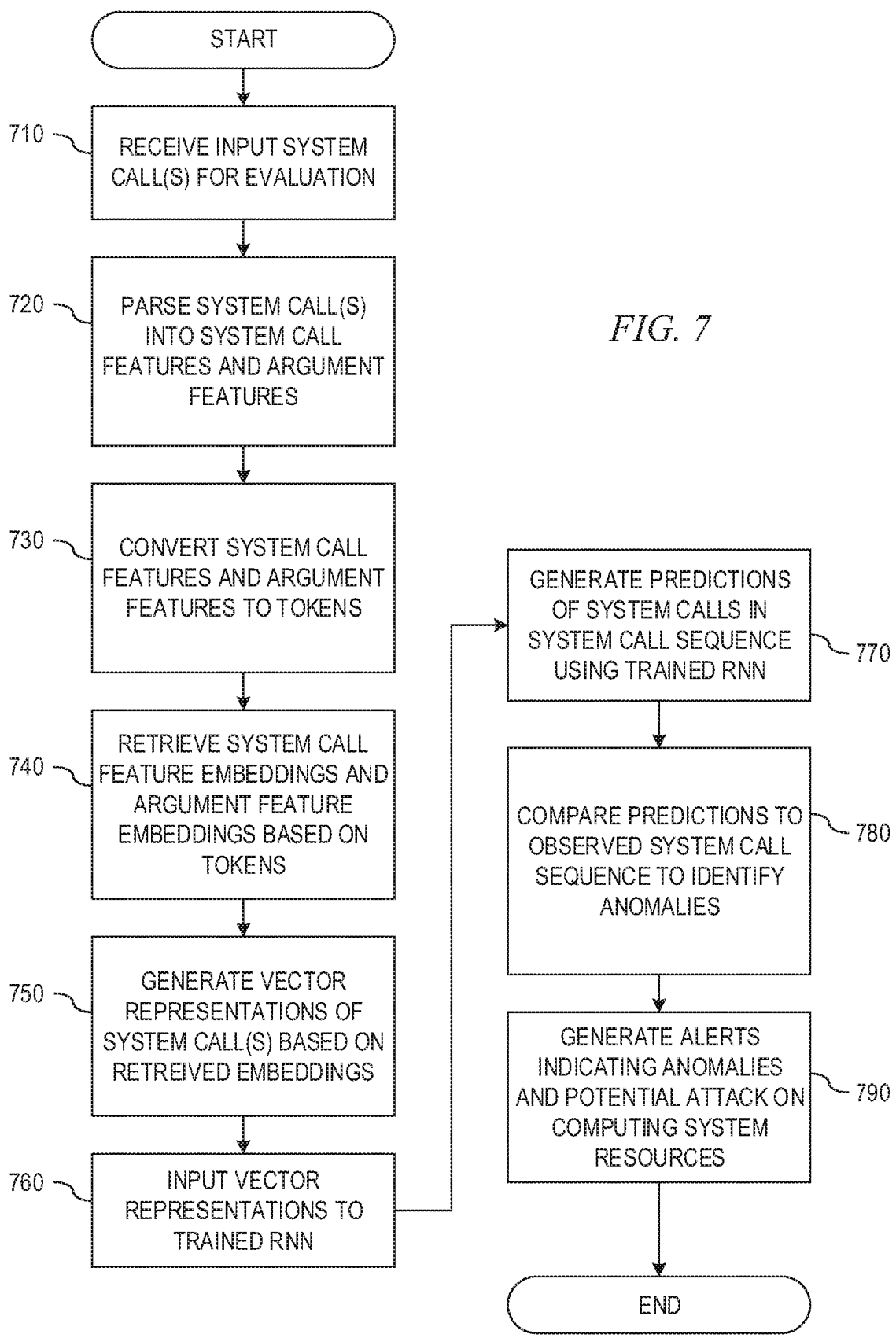
FIG. 7 is a flowchart outlining an example operation for identifying anomalous system calls in accordance with one illustrative embodiment.

FIG. 7 is a flowchart outlining an example operation for identifying anomalous system calls in accordance with one illustrative embodiment. The operation outlined in FIG. 7 assumes that the RNN has already been trained in the manner previously described above and has been deployed for use in processing system calls encountered by a monitored computing system environment, such as monitored environment 550 in FIG. 5, for example.

As shown in FIG. 7, the operation starts by receiving input comprising one or more system calls for evaluation (step 710). The system call(s) are parsed into system call features and argument features (step 720). The system call features and argument features are converted to tokens (step 730) which are then used to retrieve corresponding embeddings from the system call embedding matrix data structure and argument embedding data structure (step 740). It should be remembered that the embedding values are values learned by the training process executed on the RNN through the back propagation mechanisms and loss minimization mechanisms described above.

Based on the retrieved embeddings for the system call features and the argument features, vector representations of the system call(s) are generated (step 750). The vector representations are input to the trained RNN (step 760) which generates predictions of system calls in the system call sequence (step 770). The predictions generated by the RNN are compared to the observed system call sequence to identify differences indicative of anomalies (step 780). Based on the identified anomalies, alerts indicating the anomalies are generated and logged/transmitted in order to inform appropriate personnel of a potential attack on the computing system resources of the monitored computing environment (step 790). The operation then terminates. While the figure shows the operation terminating, it should be appreciated that this same process may be performed with each subsequent input of a system call or system call sequence for evaluation.

Thus, the illustrative embodiments provide mechanisms for training a recurrent neural network (RNN) to predict system call sequences. Moreover, the illustrative embodiments provide mechanisms for utilizing a trained RNN to predict a system call sequence given an input system call and then comparing the prediction to the observed system call sequence to identify anomalies. Based on the identification of anomalies an alert may be generated so as to inform appropriate personnel of the potential of an attack on critical computing system resources. Because the RNN is trained to predict sequences of system calls, the RNN is able to evaluate long duration attacks on critical computing system resources, rather than being limited to the short sighted nature of known mechanisms as discussed above.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting abnormal system call sequences in a monitored computing environment, the method comprising:
   receiving, from a computing system resource of the monitored computing environment, a system call of an observed system call sequence for evaluation;
   processing, by a trained recurrent neural network (RNN) trained to predict system call sequences, the system call to generate a prediction of a subsequent system call in a predicted system call sequence;
   comparing, by abnormal call sequence logic, the subsequent system call in the predicted system call sequence to an observed system call in the observed system call sequence;
   identifying, by the abnormal call sequence logic, a difference between the predicted system call sequence and the observed system call sequence based on results of the comparing; and
   generating, by the abnormal call sequence logic, an alert notification in response to identifying the difference, wherein processing the system call comprises converting the system call into a vector representation of the system call by performing a first embedding operation on a system call feature of the system call and a separate second embedding operation on one or more argument features of the system call to generate a system call feature embedding comprising machine learned embedding values and one or more argument feature embeddings comprising machine learned embedding values.

2. The method of claim 1, wherein processing the system call further comprises inputting the vector representation of the system call into a long short term memory (LSTM) cell such that the RNN generates, for each system call feature of a plurality of system call features, and each argument feature of a plurality of argument features, probabilities that the corresponding system call feature or the corresponding argument feature is part of a subsequent system call in the predicted system call sequence.

3. The method of claim 2, wherein the prediction of the subsequent system call is generated at least by:
   generating a plurality of combinations of system call features and argument features from the plurality of system call features and plurality of argument features and, for each combination in the plurality of combinations, combining probabilities of each system call feature and each argument feature of the combination to generate a probability for the combination; and
   selecting a combination from the plurality of combinations to represent the predicted subsequent system call based on the combined probabilities for the combinations in the plurality of combinations.

4. The method of claim 1, wherein converting the system call into the vector representation of the system call comprises:
   converting the system call into a tokenized representation of the system call by mapping a system call feature of the system call to a first token and one or more argument features of the system call to one or more second tokens based on a system call feature mapping data structure and an argument feature mapping data structure.

5. The method of claim 4, wherein processing the system call comprises:
   converting the tokenized representation of the system call to a vector representation of the system call by using the first token to index into a system call feature embedding matrix data structure and retrieving a system call feature embedding corresponding to the first token, and using the at least one or more second tokens to index into an argument feature embedding matrix data structure and retrieving corresponding argument feature embeddings corresponding to the one or more second tokens; and
   concatenating the system call feature embedding and the one or more argument feature embeddings to generate the vector representation of the system call.

6. The method of claim 1, wherein identifying, by the abnormal call sequence logic, a difference between the predicted system call sequence and the observed system call sequence based on results of the comparing further comprises:
   identifying the difference as an anomaly;
   maintaining, over a predetermined period of time, a count of a number of anomalies identified during the predetermined period of time;
   comparing the count of the number of anomalies to a threshold number of anomalies; and
   determining that the alert notification is to be generated in response to the number of anomalies being equal to or greater than the threshold number of anomalies.

7. The method of claim 1, wherein identifying, by the abnormal call sequence logic, a difference between the predicted system call sequence and the observed system call sequence based on results of the comparing further comprises:
   comparing a probability of the predicted system call sequence to a threshold probability value; and
   in response to the probability of the predicted system call sequence being equal to or greater than the threshold probability value, and the existence of the difference between the predicted system call sequence and the observed system call sequence, determining that the alert notification is to be generated.

8. The method of claim 1, further comprising:
automatically performing a responsive action in response to identifying the difference between the predicted system call sequence and the observed system call sequence, wherein the responsive action comprises at least one of quarantining a process that submitted the observed system call sequence, blocking or filtering future system calls from the process that submitted the observed system call sequence, collecting data about the process that submitted the observed system call sequence, or terminating the process that submitted the observed system call sequence.

9. The method of claim 1, further comprising:
initializing a system call feature embedding data structure to an initial state;
initializing an argument call feature embedding data structure to an initial state; and
training the RNN based on a training dataset comprising a plurality of system call sequences, wherein the training of the RNN comprises iteratively modifying embedding values in at least one of the system call feature embedding data structure or the argument call feature embedding data structure to generate trained embedding values in the system call feature embedding data structure and the argument call feature embedding data structure.

10. A computer program product comprising a computer readable storage medium having a computer readable program stored therein, wherein the computer readable program, when executed on a data processing system, causes the data processing system to specifically configure the data processing system to:
receive, from a computing system resource of the monitored computing environment, a system call of an observed system call sequence for evaluation;
process, by a trained recurrent neural network (RNN) of the data processing system, trained to predict system call sequences, the system call to generate a prediction of a subsequent system call in a predicted system call sequence;
compare, by abnormal call sequence logic of the data processing system, the subsequent system calls in the predicted system call sequence to an observed system call in the observed system call sequence;
identify, by the abnormal call sequence logic, a difference between the predicted system call sequence and the observed system call sequence based on results of the comparing; and
generate, by the abnormal call sequence logic, an alert notification in response to identifying the difference, wherein the computer readable program further configures the data processing system to process the system call at least by converting the system call into a vector representation of the system call by performing a first embedding operation on a system call feature of the system call and a separate second embedding operation on one or more argument features of the system call to generate a system call feature embedding comprising machine learned embedding values and one or more argument feature embeddings comprising machine learned embedding values.

11. The computer program product of claim 10, wherein the computer readable program further configures the data processing system to process the system call further at least by inputting the vector representation of the system call into a long short term memory (LSTM) cell such that the RNN generates, for each system call feature of a plurality of system call features, and each argument feature of a plurality of argument features, probabilities that the corresponding system call feature or the corresponding argument feature is part of a subsequent system call in the predicted system call sequence.

12. The computer program product of claim 11, wherein the computer readable program further configures the data processing system to generate the prediction of the subsequent system call at least by:
generating a plurality of combinations of system call features and argument features from the plurality of system call features and plurality of argument features and, for each combination in the plurality of combinations, combining probabilities of each system call feature and each argument feature of the combination to generate a probability for the combination; and
selecting a combination from the plurality of combinations to represent the predicted subsequent system call based on the combined probabilities for the combinations in the plurality of combinations.

13. The computer program product of claim 10, wherein the computer readable program further configures the data processing system to convert the system call into the vector representation of the system call at least by:
converting the system call into a tokenized representation of the system call by mapping a system call feature of the system call to a first token and one or more argument features of the system call to one or more second tokens based on a system call feature mapping data structure and an argument feature mapping data structure.

14. The computer program product of claim 13, wherein the computer readable program further configures the data processing system to process the system call at least by:
converting the tokenized representation of the system call to a vector representation of the system call by using the first token to index into a system call feature embedding matrix data structure and retrieving a system call feature embedding corresponding to the first token, and using the at least one or more second tokens to index into an argument feature embedding matrix data structure and retrieving corresponding argument feature embeddings corresponding to the one or more second tokens; and
concatenating the system call feature embedding and the one or more argument feature embeddings to generate the vector representation of the system call.

15. The computer program product of claim 10, wherein the computer readable program further configures the data processing system to identify, by the abnormal call sequence logic, a difference between the predicted system call sequence and the observed system call sequence based on results of the comparing further at least by:
identifying the difference as an anomaly;
maintaining, over a predetermined period of time, a count of a number of anomalies identified during the predetermined period of time;
comparing the count of the number of anomalies to a threshold number of anomalies; and determining that the alert notification is to be generated in response to the number of anomalies being equal to or greater than the threshold number of anomalies.

16. The computer program product of claim 10, wherein the computer readable program further configures the data processing system to identify, by the abnormal call sequence logic, a difference between the predicted system call sequence and the observed system call sequence based on results of the comparing at least by:
    comparing a probability of the predicted system call sequence to a threshold probability value; and
    in response to the probability of the predicted system call sequence being equal to or greater than the threshold probability value, and the existence of the difference between the predicted system call sequence and the observed system call sequence, determining that the alert notification is to be generated.

17. The computer program product of claim 10, wherein the computer readable program further configures the data processing system to:
    automatically perform a responsive action in response to identifying the difference between the predicted system call sequence and the observed system call sequence, wherein the responsive action comprises at least one of quarantining a process that submitted the observed system call sequence, blocking or filtering future system calls from the process that submitted the observed system call sequence, collecting data about the process that submitted the observed system call sequence, or terminating the process that submitted the observed system call sequence.

18. A data processing system comprising:
    a recurrent neural network (RNN); and
    a processor configured to execute abnormal call sequence logic, wherein:
    the RNN is trained to predict system call sequences,
    the RNN receives, from a computing system resource of the monitored computing environment, at least one system call of an observed system call sequence for evaluation;
    the RNN processes the at least one system call to generate a prediction of a subsequent system call in a predicted system call sequence;
    the abnormal call sequence logic compares the subsequent system call in the predicted system call sequence to an observed system call in the observed system call sequence;
    the abnormal call sequence logic identifies a difference between the predicted system call sequence and the observed system call sequence based on results of the comparing; and
    the abnormal call sequence logic generates an alert notification in response to identifying the difference, wherein processing the system call comprises converting the system call into a vector representation of the system call by performing a first embedding operation on a system call feature of the system call and a separate second embedding operation on one or more argument features of the system call to generate a system call feature embedding comprising machine learned embedding values and one or more argument feature embeddings comprising machine learned embedding values.

* * * * *